United States Patent                  (10) Patent No.:     US 7,759,596 B2
Filev et al.                             (45) Date of Patent:         Jul. 20, 2010

(54) METHOD FOR CONTROLLING WELD ENERGY

(75) Inventors: Dimitar Filev, Novi, MI (US); Dave Chesney, Northville, MI (US); Mahmoud El banna, Dearborn, MI (US); Tamara Hanel, Royal Oak, MI (US)

(73) Assignee: Ford Motor Company, Dearborn, MI (US)

( * ) Notice: Subject to any disclaimer, the term of this patent is extended or adjusted under 35 U.S.C. 154(b) by 944 days.

(21) Appl. No.: 11/290,663

(22) Filed: Nov. 30, 2005

(65) Prior Publication Data

US 2007/0119823 A1 May 31, 2007

(51) Int. Cl.
B23K 11/24 (2006.01)
(52) U.S. Cl. .................................... 219/110; 219/117.1
(58) Field of Classification Search ................. 219/109, 219/110, 117.1, 121.14, 121.64, 121.46
See application file for complete search history.

(56) References Cited

U.S. PATENT DOCUMENTS

| 3,389,239 | A | * | 6/1968 | Treppa et al. | 219/110 |
| 3,445,768 | A | * | 5/1969 | Ferguson | 219/109 |
| 3,591,764 | A | * | 7/1971 | Taran et al. | 219/110 |
| 3,609,285 | A | * | 9/1971 | Scarpelli et al. | 219/109 |
| 4,477,709 | A | * | 10/1984 | Cleveland et al. | 219/109 |
| 4,745,255 | A | * | 5/1988 | Mettier | 219/110 |
| 4,885,451 | A | * | 12/1989 | Farrow et al. | 219/110 |
| 5,081,338 | A | * | 1/1992 | Dufrenne | 219/109 |
| 5,393,950 | A | | 2/1995 | Killian | |
| 5,406,045 | A | * | 4/1995 | Kiriishi et al. | 219/110 |
| 5,450,315 | A | | 9/1995 | Stefanski | |
| 5,834,729 | A | * | 11/1998 | Ishikawa | 219/110 |
| 5,892,197 | A | * | 4/1999 | Goto et al. | 219/110 |
| 6,018,729 | A | | 1/2000 | Zacharia et al. | |
| 6,479,784 | B1 | * | 11/2002 | Tagliavini | 219/109 |
| 6,506,997 | B2 | | 1/2003 | Matsuyama | |

FOREIGN PATENT DOCUMENTS

| JP | 55-120491 A | * | 9/1980 |
| JP | 56-163083 A | * | 12/1981 |
| JP | 59-218284 A | * | 12/1984 |

(Continued)

OTHER PUBLICATIONS

Chen et al., "Modeling and Fuzzy Control of the Resistance Spot Welding Process", Jul. 1997, SICE'97, Proceedings of the 36th SICE Annual Conference, International Session Papers, pp. 989-994.*

(Continued)

*Primary Examiner*—Geoffrey S Evans
(74) *Attorney, Agent, or Firm*—Tung & Associates; Raymond L. Coppiellie

(57) ABSTRACT

A method for controlling weld energy used in a welding process. The method includes establishing a weld energy profile having a total weld energy used over the period of the weld cycle. During the welding process, the expulsion rate is monitored and used to modify the weld energy. Based on the expulsion rate occurring during the welding process, the total weld energy can be shifted between various phases or cycles. In addition, the overall amount of or total weld energy can be increased and decreased.

17 Claims, 3 Drawing Sheets

FOREIGN PATENT DOCUMENTS

| | | | | |
|---|---|---|---|---|
| JP | 63-180384 | A | * | 7/1988 |
| JP | 6-198453 | A | * | 7/1994 |
| JP | 9-216070 | A | * | 8/1997 |
| JP | 11-151579 | A | * | 6/1999 |
| JP | 2000-301348 | A | * | 10/2000 |
| JP | 63-299871 | A | * | 4/2001 |
| JP | 2001-87867 | A | * | 4/2001 |
| SU | 829369 | B | * | 5/1981 |
| WO | WO2005/099955 | A1 | * | 10/2005 |

OTHER PUBLICATIONS

Computer Based Translation of Japan Patent Document JP-9-216,070-A, published Apr. 10, 2009.*

Podrzaj et al., "Expulsion detection system for resistance spot welding based on a neural network", Feb. 2004, Institute of Physics Publishing (IOP), vol. 15, pp. 592-598.*

Computer Based Translation of Japan Patent document JP-2001-87,867-A, published Apr. 10, 2009.*

* cited by examiner

METHOD FOR CONTROLLING WELD ENERGY

CROSS-REFERENCE TO RELATED APPLICATIONS

Not applicable.

BACKGROUND OF THE INVENTION

1. Field of the Invention

The present invention relates generally to resistance welding and more specifically to a method for controlling and adaptively changing weld energy based on expulsion occurrence.

2. Description of Related Art

Resistance welding is used to weld pieces of metal together. Typically resistance welding uses two large electrodes that are placed on opposite sides of the surface to be welded. A large electric current passes through the electrodes and correspondingly heats up the metal between the electrodes. The result is a small area that is quickly heated to the melting point, forming a small spot of welded metal.

Achieving a good weld starts with a good process design that controls the welding variables such as weld energy and time. For example, if not enough weld energy is applied, a cold weld may result caused by insufficient heat at the welding interface whereby fusion occurs only between the point contacts of the two pieces of metal. Conversely, if too much weld energy is applied for too long, expulsion may occur. Expulsion is the forceful ejection of molten metal from the welds and often results in material burn through.

In the interest of obtaining good welds, it is desirable to monitor the welding process and adaptively change the weld energy as necessary to maintain weld quality.

SUMMARY OF THE INVENTION

Accordingly, the present invention is a method for controlling weld energy used in a welding process. The method includes the steps of establishing a weld energy profile having a total weld energy used over the period of the weld cycle to perform the welding process or operation. During the welding process the expulsion rate occurrence is monitored and recorded. Based on the expulsion rate, the weld energy is modified after which the modified weld energy is used to perform subsequent welding processes.

In one embodiment, the total weld energy is partitioned into a first phase and a second phase and the expulsion rate for each phase is determined. Based on the expulsion rate occurring in each phase, the total weld energy is shifted to increase or decrease the amount of weld energy in the particular phases.

In an additional embodiment, the total weld energy is either increased or decreased based on the overall expulsion rate occurrence. Accordingly, if the overall expulsion rate is high, the total weld energy is reduced and if the overall expulsion rate is low the total weld energy is increased.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
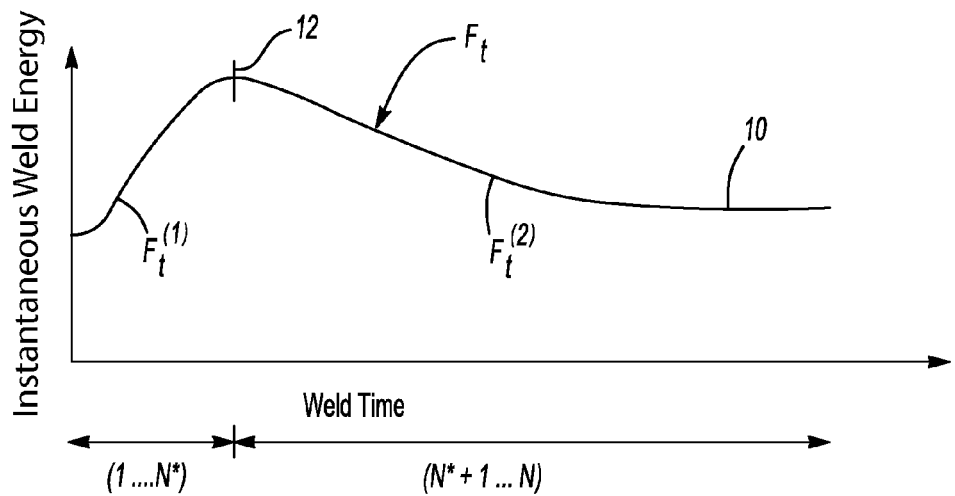
FIG. 1 is a schematic view of a weld energy profile.

FIG. 1 schematically illustrates the dynamic electrical properties occurring during spot welding. Welds with an acceptable button size have a weld energy profile 10 based on cycles or time and weld energy. The weld energy profile 10 represents the total factored energy $F_t$. In accordance with the present invention, the total factored energy $F_t$ is partitioned or divided at partition point 12 into two parts having partial factored energies $F_t^{(1)}$ and $F_t^{(2)}$ of a duration or time period N* and (N−N*) not necessarily equal. The partition point 12 can be defined for instance by the melting point or based on other considerations needed to produce a satisfactory weld. The total factored energy $F_t$ is a product of the sum of the factored energy $F_t^{(1)}$ and $F_t^{(2)}$, where $F_t = F_t^{(1)} + F_t^{(2)}$.

Figure 2:
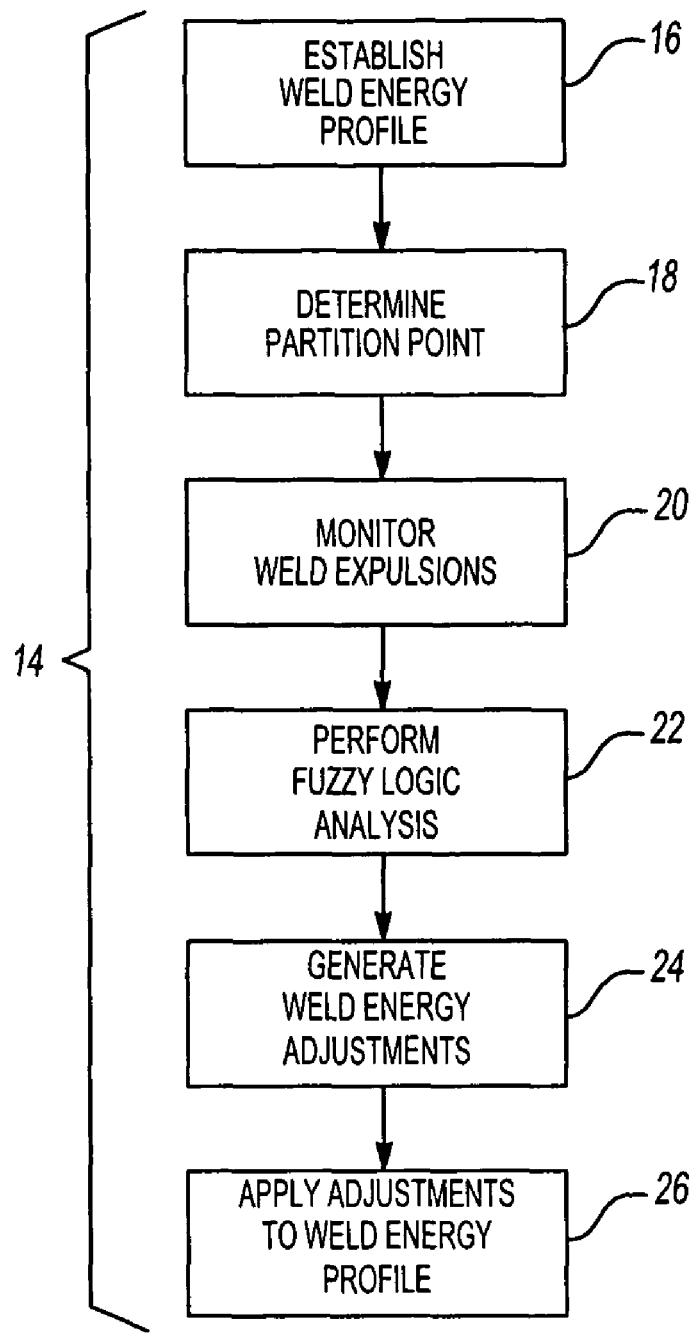
FIG. 2 is a block diagram illustrating an overall method of one embodiment of the present invention.

Referring to FIG. 2 a block diagram of a method 14 for controlling the total factored energy $F_t$ used in the welding process is illustrated. In operation, the method 14 begins with block 16 wherein a weld energy profile 10, as illustrated in FIG. 1, is established. As set forth previously, the weld energy profile 10 has a total factored energy $F_t$. The weld energy profile 10 can be created to empirical data or it can be provided based on data for the particular material.

Block 18 illustrates determining the partition point 12. Once the time periods of the $F_t^{(1)}$ and $F_t^{(2)}$, that is the partition point 12 is established, the time for completion of a single weld is divided into two intervals, including half cycles, $(1, \ldots, N^*)$ and $(N^*+1, \ldots, N)$. Denoting α as the current partitioning of the total factored energy, that is, viewing each part $F_t^{(1)}$ and $F_t^{(2)}$ as a percentage or ratio of the total factored energy $F_t$ then:

$$\alpha = F_t^{(1)}/(F_t^{(1)} + F_t^{(2)}).$$

Alternatively, the partial factored energies $F_t^{(1)}$ and $F_t^{(2)}$ can be expressed as:

$$F_t^{(1)} = \alpha F_t; \quad F_t^{(2)} = (1-\alpha)F_t$$

Thus, α defines the current partitioning of the total factored energy.

In addition, in order to account for any uncertainties during the setup phase and eventual process/material changes the present invention also provides for an increase and decrease of the total factored energy $F_t$ whereby:

$$F_t = F_t(1 + \gamma F_t).$$

Parameter γ is by default equal to 0 but can be dynamically adjusted as necessary to increase or decrease the total factored energy $F_t$.

Parameters α and γ introduce flexibility to manage the total factored energy. Block 20 illustrates that the expulsion rate occurring during the welding process is monitored and recorded. Block 22 then performs a fuzzy logic analysis on the expulsion rates and converts the expulsion occurrence data into output control values. Block 24 uses the output control values along with the expulsion rates to generate weld energy adjustments. Whereby block 26 applies the adjustments to the weld energy profile 10 to adaptively change the total factored energy $F_t$ based on weld expulsion rates. Accordingly, the present invention links the rate of expulsion to weld energy management; specifically, parameters α and γ. As set forth more fully herein, the invention provides necessary adjustments of those parameters α, γ based on the actual conditions including dynamic shifting of the total factored energy $F_t$ based on expulsion occurrence in the first and second parts or phases $F_t^{(1)}$ and $F_t^{(2)}$ of the welding process and fine tuning of the total factored energy $F_t$ based on the overall expulsion rate.

Accordingly, the original distribution of the total factored energy $F_t$ of the weld profile is automatically compensated by gradually shifting the energy in a direction that minimizes the expulsion rate. Monitoring the expulsion rate for a given process window or number of welds (p) establishes the rates $R_1$, $R_2$ in the first and second parts or intervals as:

$$R_1 = n_1/p;\ R_2 = n_2/p.$$

Where $n_1$ is the total number of expulsions during half cycles $(1, \ldots, N^*)$ and $n_2$ is the total number of expulsions during half cycles $(N^*+1, \ldots, N)$ for the last p welds.

A fuzzy logic controller executes fuzzy logic inference rules from a fuzzy rule base. Input and output variables are defined as members of fuzzy sets with degrees of membership in the respective fuzzy sets determined by specific membership functions. The rule base defines the fuzzy inference system and is based on knowledge of weld energy parameters and expulsion occurrences and rates during the weld process. The input data, or expulsion rates defines the membership functions used in the fuzzy rules. The reasoning mechanism executes the fuzzy inference rules converting the expulsion occurrence data into output control values using the database membership functions.

In general, systems using fuzzy logic inference rules are well-known. A preferred embodiment of the fuzzy logic controller disclosed herein is based on the fuzzy reasoning system using weld expulsion occurrence rates, including overall expulsion rate occurring during the total target factored energy profile $F_t$ of the welding process and the expulsion rate occurring during the first and second parts or phases $F_t^{(1)}$ and $F_t^{(2)}$ of the total target factored energy $F_t$. By adjusting the target factored energy, the fuzzy logic controller attempts to maintain weld energy based on weld expulsion occurrence.

Figure 3:
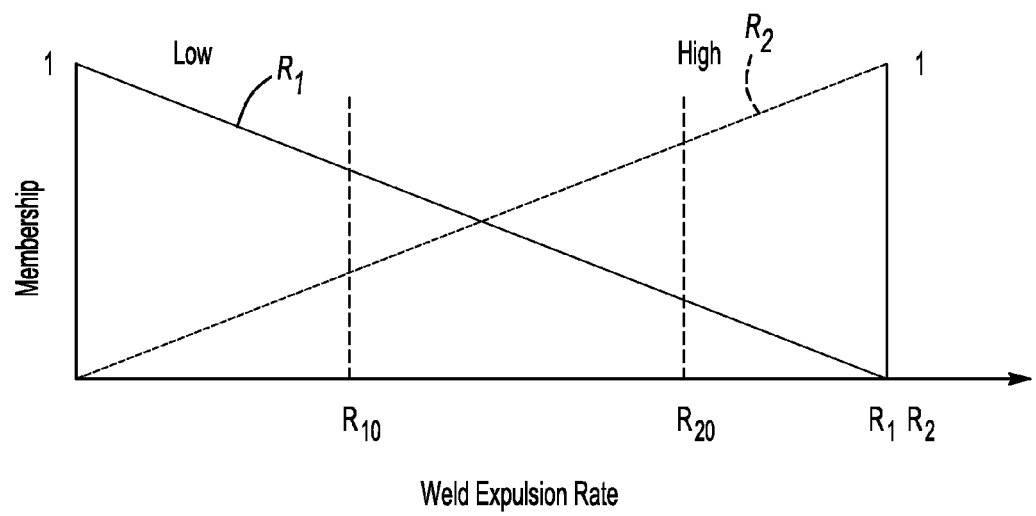
FIG. 3 illustrates fuzzy logic membership functions for input and output variables useful in adapting the weld energy profile.

FIG. 3 illustrates an embodiment of the fuzzy logic controller using a fuzzy membership function. As illustrated in FIG. 3, the membership functions include overlapping membership ranges for the expulsion rates $R_1$, $R_2$ in the first and second parts or phases $F_t^{(1)}$ and $F_t^{(2)}$ of the total factored energy $F_t$. As set forth below, the overlapping membership functions for the rate of expulsion of variables $R_1$, $R_2$ result in a corresponding subset membership determined from the fuzzy rule base.

Turning first to the adaptation of the distribution of the total factored energy $F_t$ according to parameter α, the mechanism for adjusting the total factored energy $F_t$ based on the expulsion rates is accomplished through the following rules:

IF $R_1$ is High AND $R_2$ is Low THEN dα=$N_a$
IF $R_1$ is Low AND $R_2$ is High THEN dα=$P_a$
IF $R_1$ is High AND $R_2$ is High THEN dα=Z
IF $R_1$ is Low AND $R_2$ is Low THEN dα=Z wherein $N_a$, $P_a$, Z are constants defining positive, negative, or zero percent change of the ratio parameter α and energy gain γ.

Figure 4:
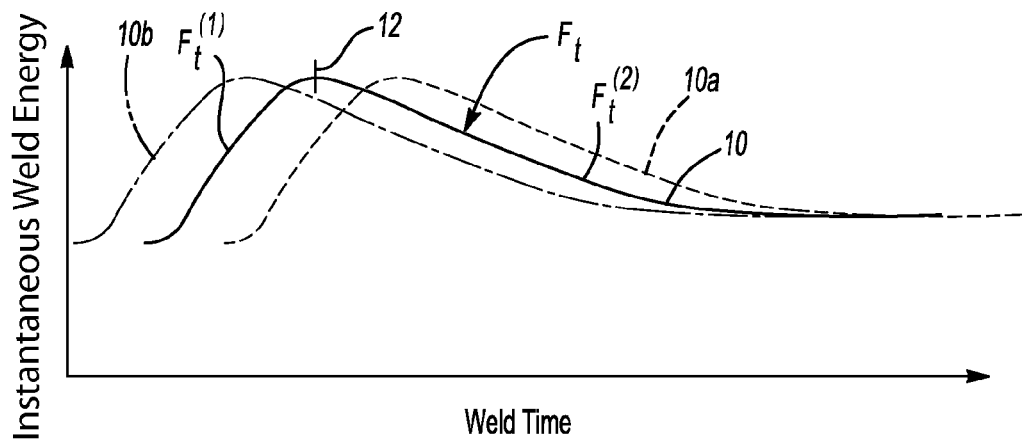
FIG. 4 is a schematic view of a weld energy profile wherein the total factored energy is shifted between first and second parts or phases based on weld expulsion rates.

As illustrated in FIG. 4, the first two rules deal with shifting the total factored energy $F_t$ towards the first or the second part of the weld process based on expulsion rate. For a high expulsion rate $R_1$ in the first part or phase $F_t^{(1)}$ it is desirable to gradually shift the energy towards the following or second part or phase $F_t^{(2)}$, illustrated by the dotted weld energy profile 10a. For a high expulsion rate $R_2$ in the second part or phase $F_t^{(2)}$ it is desirable to gradually shift the energy towards the initial or first part or phase $F_t^{(1)}$, illustrated by the dashed weld energy profile 10b. Shifting the weld energy profile 10 is accomplished by modifying the rate of change of parameter α controlling the ratio of the total factored energies. No major changes occur with the gain parameter γ.

The third and forth rule are activated when the overall expulsion rate is either high or low. In these cases, the focus is on increasing or decreasing of the overall target energy rather than redistributing or shifting the energy.

Turning now to the adaptation of the overall target factored energy $F_t$ according to parameter γ. A high overall expulsion rate, i.e. expulsions consistently occurring in the first $F_t^{(1)}$ and in the second $F_t^{(2)}$ parts or phases of the total factored energy $F_t$ of welding process, requires an overall reduction of the target factored energy. Decreasing the energy gain parameter γ, which controls the overall level of the target energy, results in a reduction of the target factored energy $F_t$. Alternatively, a consistent lack of expulsions should be considered as an indicator that the overall target factored energy $F_t$ is below the minimum for an acceptable weld. Thus, increasing the energy gain parameter γ, results in an increase of the target factored energy $F_t$.

Accordingly, increasing or decreasing the total factored energy $F_t$ according to parameter γ, the mechanism for adjusting the total factored energy $F_t$ based on the expulsion rates, is accomplished through the following rules:

IF $R_1$ is High AND $R_2$ is High THEN dγ=$N_g$
IF $R_1$ is Low AND $R_2$ is Low THEN dγ=$P_g$
IF $R_1$ is High AND $R_2$ is Low THEN dγ=Z
IF $R_1$ is Low AND $R_2$ is High THEN dγ=Z wherein $N_g$, $P_g$, Z are constants defining positive, negative, or zero percent change of the energy gain γ.

Figure 5:
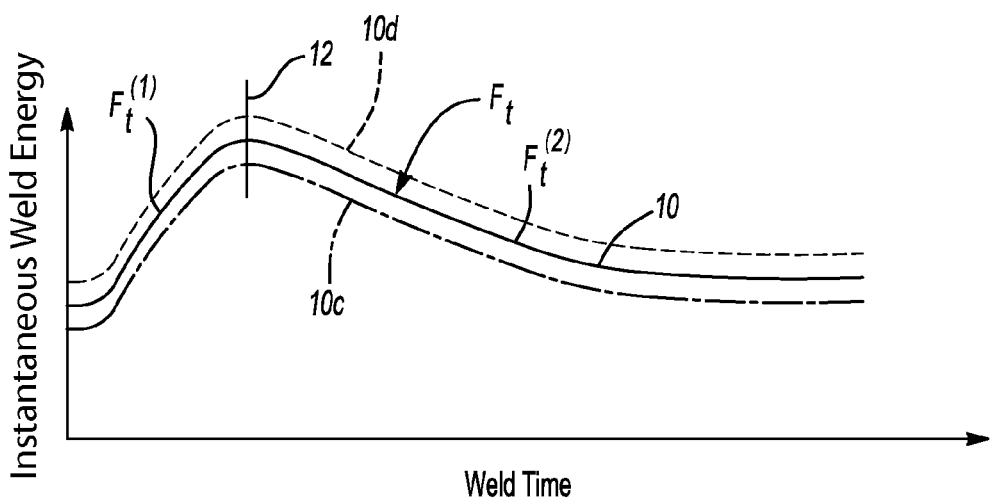
FIG. 5 is a schematic view of a weld energy profile wherein the total factored energy is increased or decreased based on weld expulsion rates.

As illustrated in FIG. 5, the first two rules are activated when both expulsion rates; i.e., the rates in both the first $F_t^{(1)}$ and in the second $F_t^{(2)}$ parts or phases of the total factored energy $F_t$ are low or high. In the case of a high overall expulsion rate it is desirable to gradually shift or decrease the overall level of the total factored energy $F_t$, illustrated by the dashed weld energy profile 10c. The second rule reflects the situation when the overall expulsion rate is low. Since this may result in a cold weld, it is desirable to gradually shift or increase the overall level of the total factored energy $F_t$, illustrated by the dotted line 10d. If the increase is too great, then it would be immediately limited by the first rule. This allows the target factored energy $F_t$ to stay close to the edge of creating expulsions while minimizing the chance for a cold weld. The third and forth rule deactivate the changes of parameter γ when an energy shift is required.

Accordingly, adaptation of parameters α and γ can be combined into a single set of rules as follows:

IF $R_1$ is High AND $R_2$ is Low THEN dα=$N_a$ and dγ=Z
IF $R_1$ is Low AND $R_2$ is High THEN dα=$P_a$ and dγ=Z
IF $R_1$ is High AND $R_2$ is High THEN dα=Z and dγ=$N_g$
IF $R_1$ is Low AND $R_2$ is Low THEN dα=Z and dγ=$P_g$ Applying the fuzzy reasoning algorithm we obtain an analytical expression for the change of parameters $\alpha$ and $\gamma$ in dependence on the rates $R_1$ and $R_2$:

$$d\alpha = R_1(1-R_2)N_a + R_2(1-R_1)P_a + R_1R_2Z + (1-R_1)(1-R_2)Z$$

$$d\gamma = R_1R_2N_g + (1-R_1)(1-R_2)P_g + R_1(1-R_2)Z + R_2(1-R_1)Z$$

Solving for the corresponding $d\alpha$ and $d\gamma$ and applying the change to the original rate of change of parameter $\alpha$ and energy gain parameter $\gamma$ yields:

$$\alpha = \alpha + d\alpha$$

$$\gamma = \gamma + d\gamma$$

Applying the new rate of change of parameter $\alpha$ to the total factored energy $F_t$ changes the partial target factored energies $F_t^{(1)}$ and $F_t^{(2)}$ as follows:

$$F_t^{(1)} = \alpha F_t;\ F_t^{(2)} = (1-\alpha)F_t$$

Applying the new energy gain parameter $\gamma$ to the total factored energy $F_t$ changes the total factored energy as follows:

$$F_t = F_t(1 + \gamma F_t).$$

As demonstrated above, the present invention optimizes the weld energy, that is the energy per unit volume of weld, such that the total factored energy supplied to the weld reaches a point at or near the energy at which expulsion occurs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling weld energy used in a welding process comprising the steps of:
    establishing an energy profile used over the period of the weld cycle to perform the welding process;
    monitoring the expulsion rate during the welding process;
    modifying the established energy profile based on the expulsion rate; and
    using the modified energy profile to perform the welding process;
    creating a target factored energy profile used to calculate a total factored energy needed to produce the weld; and
    partitioning the total factored energy into a first part and a second part.

2. The method of claim 1 including the step of using the melting point of a weldment to determine the partition point used to divide the total factored energy into the first part and the second part.

3. The method of claim 2 wherein the step of monitoring the expulsion rate during the welding process includes determining whether the expulsion occurs during the first part or the second part of the total factored energy of the welding cycle.

4. The method of claim 3 including the step of shifting the target factored energy profile based on the expulsion rate occurring in the first and second parts of the total factored energy.

5. The method of claim 3 wherein the step of shifting the target factored energy includes the step of increasing the total factored energy in the second part when the expulsion rate occurrence in the first part exceeds predetermined threshold.

6. The method of claim 3 wherein the step of shifting the target factored energy includes the step of increasing the total factored energy in the first part when the expulsion rate occurrence in the second part exceeds predetermined threshold.

7. The method of claim 3 wherein the step of shifting the target factored energy includes the step of adjusting the total factored energy and both the first part and the second part of the total factored energy based upon the expulsion rate occurring in both the first part and second part of the total factored energy.

8. The method of claim 7 including the step of lowering the overall total factored energy when the rate of expulsion occurrence in the first part and second part exceeds a predetermined threshold.

9. The method of claim 7 including the step of raising the overall total factored energy when the rate of expulsion occurrence in the first part and second part is below a predetermined threshold.

10. A method for controlling weld energy used to create a weld during a welding process comprising:
    establishing a total factored energy needed to produce a satisfactory weld and providing an energy profile based on the total factored energy;
    partitioning the total factored energy into a first part and a second part;
    performing a welding process and monitoring expulsion occurrence during the first part and the second part;
    adaptively changing the total factored energy based on the expulsion occurrence; and
    shifting the target factored energy between the first part and the second part.

11. The method of claim 10 wherein adaptively changing the total factored energy based on the expulsion occurrence includes the step of increasing the target factored energy.

12. The method of claim 10 wherein adaptively changing the total factored energy based on the expulsion occurrence includes the step of decreasing the target factored energy.

13. A method for controlling weld energy used to create a weld during a welding process comprising:
    establishing a total factored energy needed to produce a satisfactory weld and providing an energy profile based on the total target factored energy;
    partitioning the total factored energy into a first part and a second part;
    performing a welding process and monitoring expulsion occurrence during the first part and the second part;
    inputting expulsion occurrence rates into a fuzzy logic controller with associated fuzzy inference rules defining total factored energy control actions depending on various combinations of expulsion occurrence rates;
    analyzing expulsion occurrence rates in accordance with the fuzzy inference rules to determine appropriate total factored energy control actions;
    generating total factored energy adjustment parameters defining adjustments to the total factored energy; and
    applying total factored energy adjustment parameters to adjust the total factored energy.

14. The method of claim 13 wherein the step of generating total factored energy adjustment parameters includes the step of generating an adjustment factor for adjusting the total energy factor.

15. The method of claim 13 wherein the step of generating total factored energy adjustment parameters includes the step of generating an adjustment factor for adjusting the factored energy in the first part and the second part of the total factored energy.

16. The method of claim 13 wherein the step of generating total factored energy adjustment parameters includes the step of shifting the factored energy between the first part and second part of the total factored energy.

17. The method of claim 13 wherein the step of partitioning the total factored energy into a first part and a second part includes the step of establishing a partition point, wherein the partition point divides the total factored energy into the first part and the second part; and the step of generating total factored energy adjustment parameters includes the step of shifting the position of the partition point.

* * * * *